March 18, 1969

J. W. E. HANES 3,433,504

FLEXIBLE CONNECTORS

Filed July 5, 1966

INVENTOR.
JAMES W. E. HANES
BY Bernard Kriegel
ATTORNEY

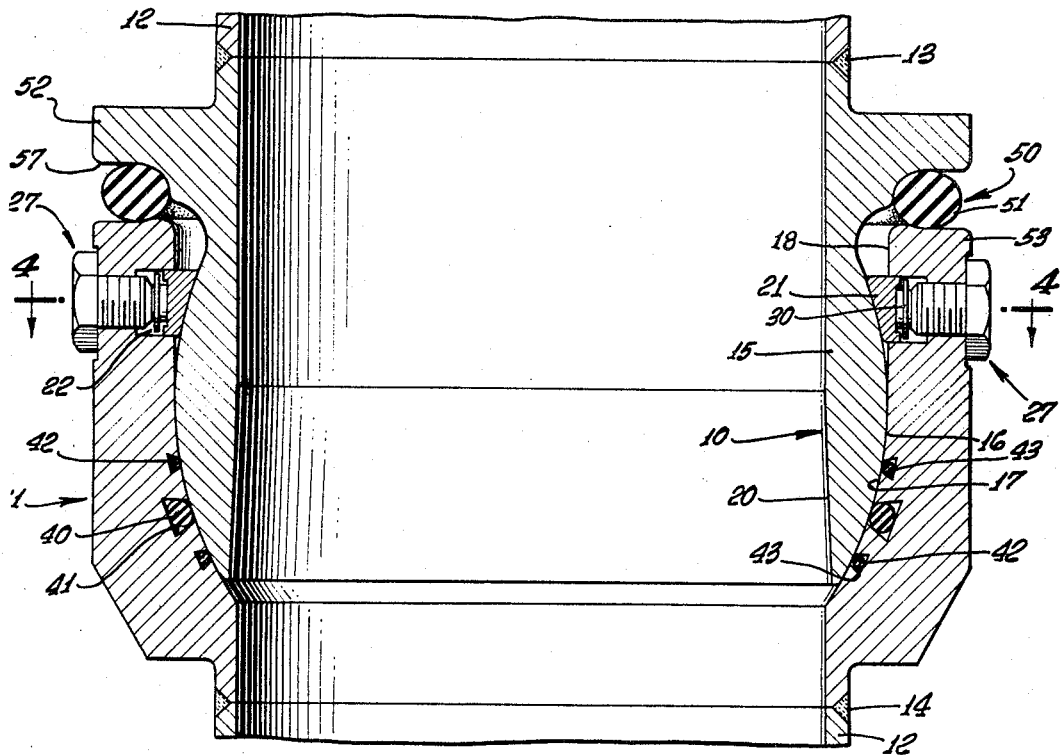
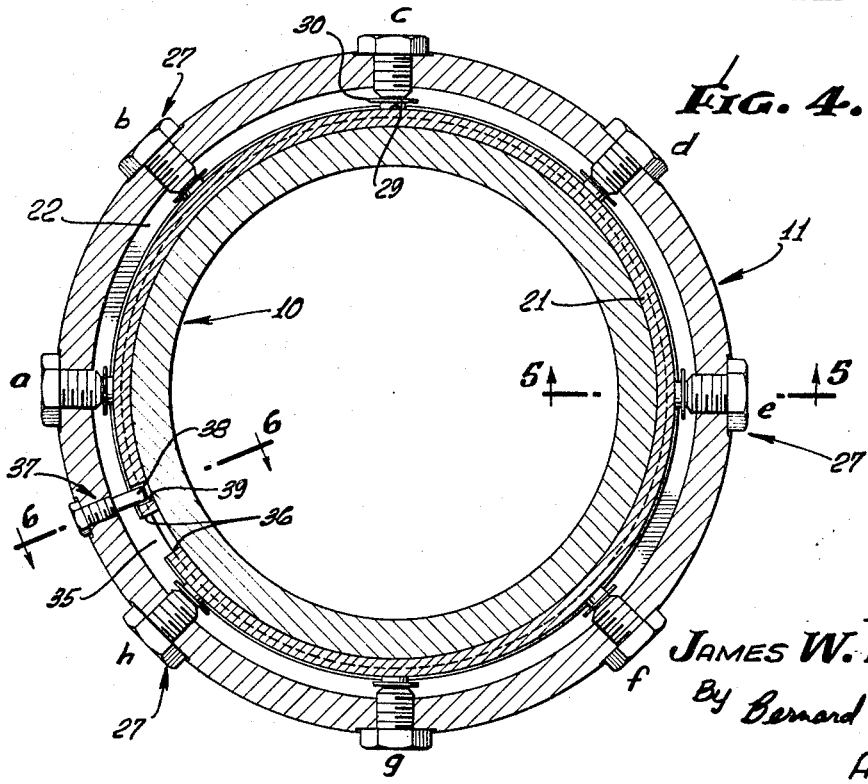

March 18, 1969  J. W. E. HANES  3,433,504
FLEXIBLE CONNECTORS
Filed July 5, 1966  Sheet 3 of 3

INVENTOR.
JAMES W. E. HANES
By Bernard Kriegel
ATTORNEY

United States Patent Office 3,433,504
Patented Mar. 18, 1969

3,433,504
FLEXIBLE CONNECTORS
James W. E. Hanes, Ventura, Calif., assignor to Ventura Tool Company, Ventura, Calif., a corporation of California
Filed July 5, 1966, Ser. No. 562,638
U.S. Cl. 285—93
Int. Cl. F16l 27/00
20 Claims

ABSTRACT OF THE DISCLOSURE

Flexible connectors for marine conductor pipe, and the like, a pin member having an external spherical portion held in a companion spherical portion of a box member by forcing and holding a lock ring carried by the box member inwardly against the external spherical portion. A pliant, elastic ring is held axially compressed between the members by the lock ring, the elastic ring permitting limited pivotal movement between the members. An offset pin fits within an offset hole in the lock ring to prevent inverted mounting of the lock ring in the box member. An indicator pin on the box member fits in a companion slot in the pin member to indicate appropriate assembly of the pin member in the box member while permitting universal pivoting movement between the pin and box members.

---

The present invention relates to connectors, and more particularly to a flexible connector especially adapted for use in a string of pipe, such as a marine riser conductor, extending between a subsea well bore and a floating barge, or other vessel, from which the well bore is being drilled.

In the drilling of underwater wells from a floating drilling vessel, the latter may move off its location above the well bore due to wind, current or wave action, and thus cause bending or deflection in the marine riser conductor, which constitutes part of the connection between the well head and the floating vessel.

It has been the practice in drilling under these conditions to use a flexible joint at the lower end of the marine riser conductor near the well head. One type of flexible joint is in the form of a ball and socket joint having about a 10 degree movement. This type of joint has the disadvantage of providing all of the bending at one point, which creates an abrupt turn conductive to excessive wear of elements moving through the conductor, such as drill pipe and the like. The cost of such a flexible joint is relatively high, and its disconnection is made with difficulty.

Another type of flexible joint includes the connecting together of short flanged spools having a thick rubber or rubber-like gasket between adjacent flanges. This arrangement is not satisfactory since it is not pressure tight, with the result that drilling mud is lost.

Lobe cut pipe with a rubber boot or sleeve disposed over the pipe has also been used. However, this arrangement is also costly, and, in general, is not satisfactory.

Accordingly, it is an object of the present invention to provide an improved flexible connector, which is especially adapted for use with a marine conductor and which overcomes the disadvantages of prior flexible connectors.

Another object of the invention is to provide a connector particularly useful in a string of marine conductor pipe, which not only functions as a connector securing adjacent portions of the marine conductor pipe to each other, or to secure the marine conductor pipe to another well device, but also as a flexible joint.

A further object of the invention is to provide a series of flexible connectors in a string of marine conductor pipe that distributes the bending or flexing action over a greater distance, reducing considerably the degree of flexing or bending at each connector or joint, and thereby minimizing the extent of wear of other devices extending through the marine conductor pipe.

An additional object of the invention is to provide a flexible connector for a marine conductor pipe, or the like, which is pressure tight.

Yet another object of the invention is to provide a flexible connector for a marine conductor pipe, which can be readily disconnected and readily assembled, with its component parts fitting snugly with respect to each other.

Still a further object of the invention is to provide a flexible connector for a marine conductor pipe that is economical to manufacture, being only slightly more costly than a non-flexing or regular marine connector.

Another object of the invention is to provide a flexible connector having a yieldable stabilizer, such as a pliant, elastic stabilizer, for resiliently maintaining a normal aligned relationship of the components of the connector with respect to one another against flexure by a force of less than a predetermined value. The stabilizer tends to maintain the neutral or straight-line condition of the connector parts with respect to one another, requiring the application of substantial horizontal loads to the marine riser before flexing or bending movement can take place in the connector.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIG. 3 is an enlarged vertical section through one of the flexible connectors illustrated in FIGS. 1 and 2;

FIG. 4 is a cross-section taken along the line 4—4 on FIG. 3;

Figure 1:
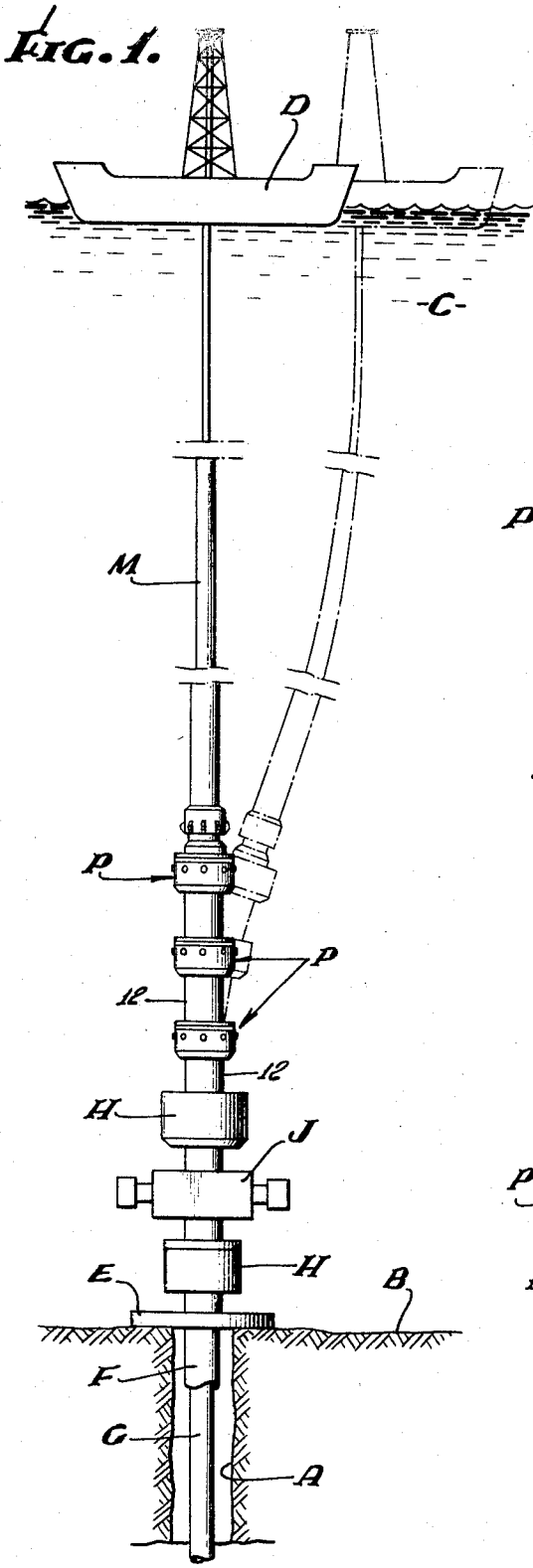
FIGURE 1 is a somewhat diagrammatic view of an underwater well bore in conjunction with a floating vessel, and a marine riser conductor and associated equipment extending between the well bore and the vessel.

As shown in FIG. 1, an underwater well bore A extends downwardly from the floor B of a body of water C on which a drilling barge or vessel D is floating. A suitable base E rests on the ocean floor, there being a plurality of concentric casing strings F, G extending downwardly into the well bore and being suitably cemented therein. One of the strings of casing is connected through a connector or connectors H and one or more blowout preventers J to the lower portion of a marine riser conductor pipe M extending upwardly to the drilling barge D. The marine conductor pipe M embodies a plurality of flexible connectors P to permit relative movement of the barge D and portions of the conductor pipe M with respect to lower portions of the marine conductor riser and the blowout preventers J and connectors H located at or adjacent to the ocean floor. As is well known, the operation of continued drilling of the well bore is conducted from the floating barge D through the marine conductor pipe M, connectors H and blowout prevents J therebelow and the casing in the well bore, the drilling operation taking place below the lower end of the casing G. The barge may tilt or move off its location directly over the well bore, imposing a horizontal or lateral strain or bend in the conductor pipe M, which the flexible connector or connectors P are designed to permit without damage to the equipment.

Three flexible connectors P are illustrated at closely spaced intervals along the marine riser conductor M adjacent to its lower end for purpose of illustration and to divide the extent of deflection of the conductor pipe between them. However, it will be appreciated that a single flexible connector may be used for certain applications, they may be used in various numbers, and they may be disposed at various intervals along the length of the conductor pipe. Since the three connectors specifically shown in the drawings are essentially the same, only one of them need be described in detail.

Each flexible connector comprises generally a ball and socket joint, each connector including a pin section 10 received within a companion box section 11. The pin member is secured to an adjacent pipe section 12 by any suitable means, such as through use of welding material 13. Similarly, the box 11 is suitably secured, as by welding material 14, to another adjacent pipe section 12. The pin 10 and box 11 preferably have an inside diameter substantially the same as the inside diameter through the marine conductor pipe or riser M thereabove, so as to avoid the presence of any restrictions in the apparatus extending between the floating barge and the well casing. Preferably, the lower inner wall 20 of the pin 10 flares outwardly.

The pin 10 includes a head 15 having a spherical external surface 16 fitting within a companion internal spherical surface 17 in the box portion 11 of the connector. The upper or outer end of the box has its inner surface 18 substantially cylindrical and tangent to the inner or spherical surface 17 therebelow, to permit insertion of the spherical head 15 within the spherical socket, with the external spherical surface 16 in slidable engagement with the internal spherical surface 17 of the box 11. When the pin 10 is appropriately assembled within the box 11, the center of both the external and internal spherical surfaces are the same, permitting the pin and box to pivot with respect to one another.

After the pin 10 has been inserted into the box 11, it is held in assembled position therewithin by a split, inherently expansible lock ring 21 disposed within an internal circumferential groove 22 in the box near its outer end, the ring having an inner spherical surface 23 conforming to the curvature of the spherical surface 16 of the head 15. The upper and lower sides 24 of the lock ring are parallel to one another and make a sliding fit with the upper and lower sides 25 of the groove 22, the ring normally expanding to its largest diameter completely within the groove 22 and free from projecting within the cylindrical wall 18 of the box to permit insertion of the pin 10 within the socket 11. After insertion of the pin within the socket, the ring 21 is contracted into snug engagement with the spherical surface 16 of the pin head. Since the ring engages such surface beyond the diameter of the spherical head 15 normal to the axis of the pin 10, its contraction will exert a longitudinal force, urging the pin 10 inwardly of the box 11 and into snug slidable engagement with the internal spherical surface 17 of the latter.

Figure 5:
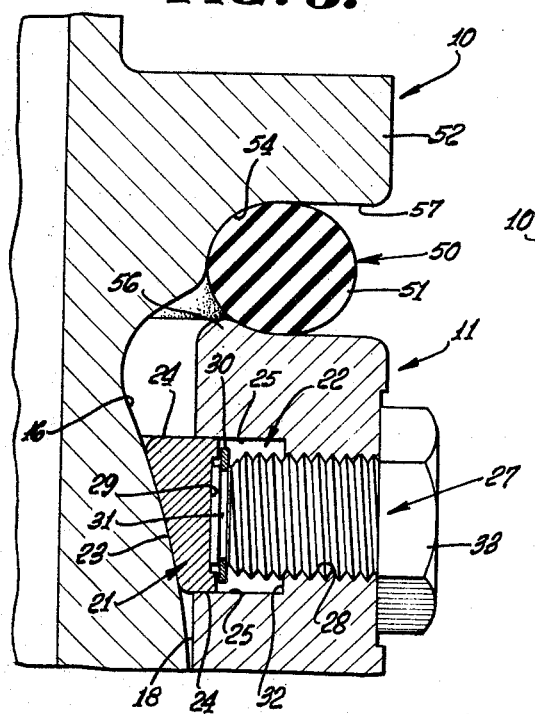
FIG. 5 is an enlarged section taken along the line 5—5 on FIG. 4.
Figure 6:
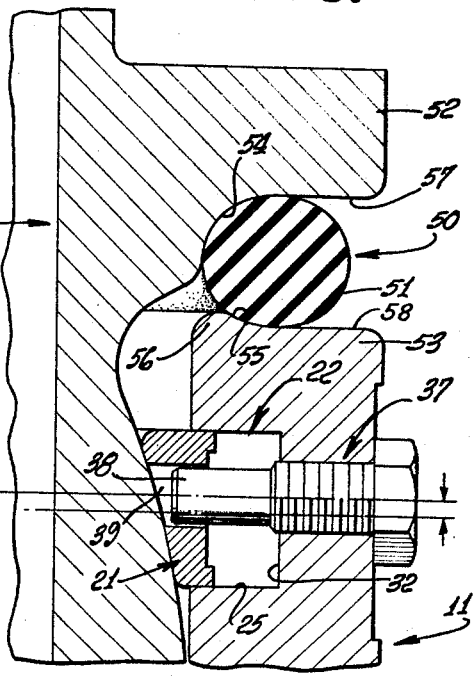
FIG. 6 is an enlarged longitudinal section taken along the line 6—6 on FIG. 4.

As disclosed perhaps most clearly in FIGS. 3, 4 and 5, the ring 21 is contracted from its expanded condition completely within the circumferential groove 22 by a plurality of circumferentially spaced screws 27 which are threaded in companion bores 28 in the box and which extend into the groove 22, with the inner ends of the screws received within an external circumferential groove 29 in the ring and engaging the base of the latter. The outward position of each screw 27, in which the lock ring 21 is disposed out of the cylindrical bore 18 of the socket, is limited by engagement of a split snap retainer stop ring 30 mounted in a peripheral groove 31 in the inner portion of each screw with the base 32 of the circumferential box groove. The innermost position of each screw 27 is determined by abutting of its head 33 against the exterior of the box 11, in which condition the ring 21 will have been contracted to the fullest extent desired, with its sides 24 still engaging the sides 25 of the internal circumferential groove 22 and with its spherical surface 23 having engaged the exterior spherical surface 16 of the pin and urged the pin longitudinally within the socket 11 to place its spherical surface 16 in snug engagement with the companion internal spherical surface 17 of the box. The parts are so proportioned that the complete inward threading of all of the screws 27 until their heads 33 are tightened against the exterior of the box 11 will result in a snug engagement of the spherical head external surface 16 with the internal spherical surface 17 of the box, and the snug engagement of the spherical surface 23 of the lock ring with the spherical surface 16 of the head, the parts, however, having appropriate working clearance so that relative pivoting movement can occur between the pin 10 and the box 11.

To insure that one of the screws 27 will not be disposed opposite the split or gap 35 between the ends 36 of the lock ring 21, a locator pin 37 is threaded into the box 11 between a pair of screws 27, this pin having an inner smooth cylindrical stem or shank 38 extending freely into a companion radial bore 39 in the lock ring adjacent one of its ends 36. As disclosed most clearly in FIG. 4, such disposition of the pin 37 within the bore 39 of the lock ring will place the split or gap 35 of the ring 21 between a pair of screws 27, to provide assurance that all of the screws 27 will engage the exterior of the lock ring.

The locator pin 37 also provides an indication of the sequence in which the screws 27 should be threaded inwardly and tightened, for the purpose of contracting the lock ring 21 against the spherical surface 16 of the head 15. Assuming that all of the screws 27 are threaded outwardly to their fullest extent, in which their stop rings 30 engage the base 32 of the internal circumferential groove, the ring can then be contracted by threading the lock screws 27 inwardly in a circumferential sequence beginning with the first screw to one side of the locator pin 37. Thus, the screws 27 can be threaded inwardly in the sequence $a$, $b$, $c$, $d$, $e$, $f$, $g$, $h$ disclosed in FIG. 4, which will fully contract the ring 21 into snug engagement with the spherical head 15, and which will also shift the spherical head to a slight extent longitudinally within the box 11 to bring the spherical head into snug engagement with the internal spherical surface 17 of the box.

To offer assurance and an indication that the lock ring 21 has not been mounted in an inverted position within the internal circumferential groove 22 in the box, the stem receiving bore 39 of the lock ring is offset from the central plane of the lock ring, and the locator pin 37 is also offset from the central plane of the internal circumferential groove 22 to the same extent. Thus, if the ring 21 were to be inadvertently mounted in an inverted position within the groove 22, the bore 39 and stem 38 of the locator pin 37 would be out of alignment and it would not be possible to thread the locator pin 37 to any substantial extent within the box, since the inner end of the stem 38 would then engage the base 29 of the external groove of the lock ring. The appropriate mounting of the lock ring 21 in the groove 22 will result in the ability to appropriately align the bore 39 of the lock ring with the stem or shank 38, permitting the pin 37 to be threaded thereinto, and thereby also offer assurance that the split or gap 35 of the lock ring 21 is disaligned from any of the screws 27.

For the purpose of assuring against leakage between the pin 10 and box 11, a suitable seal ring 40, such as a rubber or rubber-like O-ring, is mounted in an internal groove 41 in the box and is adapted to sealingly engage the external spherical surface 16 of the pin. Actually, during use, the pin and box will only tilt with respect to each other to a relatively small extent, so that there is very little tendency to roll or otherwise displace the seal ring 40 from its companion groove 41. To offer further assurance against leakage, the external spherical surface 16 that will slide relatively over the seal ring 40 is maintained in a clean condition by upper and lower wiper rings 42 disposed in upper and lower grooves 43 on opposite sides of the seal ring 40. These wiper rings may be formed of rubber or rubber-like material, or, if desired, metallic wiping rings may be used in their stead.

It is desired that the pins and box remain in an aligned condition unless a lateral displacing force of significance is imposed on the marine conductor pipe. Accordingly, a stabilizing device 50 is incorporated in each flexible connector. As specifically disclosed in the drawings, the stabilizing device includes a yieldable stabilizing ring 51, which may be made of a suitable pliant, elastic material, such as synthetic or natural rubber, which is disposed between an external flange 52 of the pin 10 disposed in spaced relation and opposite to the outer end 53 of the box 11. This flange has an inner arcuate circumferential saddle 54 formed on its exterior, with a companion opposed saddle 55 being provided on the end of the box, the inner end of the box saddle having an upwardly curved lip 56. As shown in the drawings, the lower surface of the flange 52 has its outer portion 57 substantially normal to the axis of the pin, this lower surface merging into the inner surface 54, substantially arcuate in cross-section, and extending substantially 90 degrees in a longitudinal direction away from the normal undersurface 57 of the flange. The stabilizing ring 51, which is of toroidal shape, snugly embraces the curved saddle 54 of the flange and also engages the upper end 53 of the box 11, the outer surface 58 of such end being substantially normal to the axis of the box 11, and this end merging into the inner arcuate saddle or surface 55 extending in a direction toward the flange, the toroidal ring also snugly engaging such end curved surface of the box.

The pliant, elastic stabilizing ring 51 is mounted around and under the flange 52 of the pin 10, and the pin is then inserted into the box 11. The act of contracting the lock ring 21 by the inward threading of the lock screws a to h, inclusive, the their fullest extent serves not only to appropriately connect the pin 10 and box 11 to one another, with the various spherical surfaces having the proper working clearance with respect to one another, but, in exerting a pull on the pin inwardly of the box, it also effects a compression of the stabilizing ring 51 between the flange 52 and the end 53 of the box, imparting a resistance to pivotal movement of the pin relative to the box. The parts may be so proportioned and the stabilizing ring 51 made of such material that following its compression between the pin flange 52 and the end 53 of the box, a lateral force in excess of 6,000 lbs., for example, would be required for the pin 10 and box 11 to relatively tilt and effect a further compression of the stabilizing ring. The elasticity of the ring 51 is such that it normally tends to maintain the ball and socket or pin and box members in a neutral or straight-line position with respect to one another. Substantial horizontal or lateral loads must be applied to the marine riser M before any movement will take place in a flexible connector P. When such substantial horizontal or lateral load is removed, the stabilizing ring 51 will return the ball and socket portions 10, 11 of the connector to their original in-line position.

Figure 7:
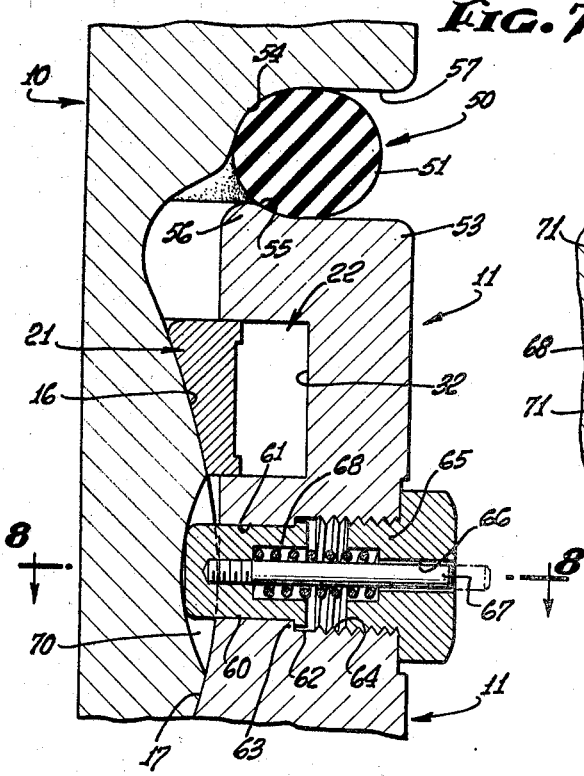
FIG. 7 is an enlarged section of a portion of the flexible connector taken along the line 7—7 on FIG. 2.
Figure 8:
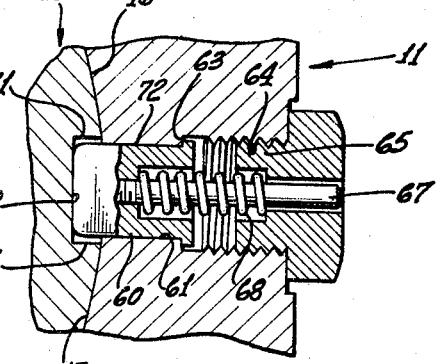
FIG. 8 is a cross-section taken along the line 8—8 on FIG. 7.

Although relative pivoting between the ball 10 and socket portions 11 of the flexible joint is permitted, it is desired to prevent their substantial relative rotation in order that auxiliary equipment (not shown) may be lowered from the floating vessel D on rails (not shown) attached to the exterior of the marine riser M. As shown most clearly in FIGS. 7 and 8, a square or rectangular cross-section pin 60 is slidable in a companion radial hole 61 in the box 11, these parts being disposed radial of the center of the spherical external and internal surfaces 16, 17 of the pin and box. The socket pin 60 has an outer flange 62 adapted to engage the base 63 of a threaded counterbore 64, in which a spring seat 65 is threaded, this spring seat having a radial bore 66 through which an indicator rod 67 extends, the inner portion of the indicator rod being threadedly or otherwise suitably secured to the socket pin 60. A helical compression spring 68 surrounds the indicator rod, its outer end engaging the spring seat 65 and its inner end engaging the socket pin 60, yieldably urging the latter in an inward direction. However, the socket pin 60 may shift outwardly in its companion bore 61 completely from projection within the spherical surface 17 of the box, causing its indicator rod 67 to project outwardly beyond the outer end of the spring seat 65, and thereby giving an indication to the operator that the socket pin 60 is disposed outwardly.

When the socket pin 60 is aligned with a slot 70 formed in the exterior of the spherical head 15 of the pin, the spring 68 will shift the socket pin inwardly into such slot to an extent determined by engagement of the socket pin flange 62 with the base 63 of the counterbore, the slot having opposed parallel sides 71 companion to the opposed parallel flat sides 72 on the pin. Thus, the pin 10 and box 11 are appropriately oriented with respect to one another to prevent their substantial relative rotation, while still permitting their angular deflection or pivoting with respect to one another in all directions, since the width of the slot 70 is greater than the corresponding width of the pin 60. The appropriate orienting of the pin and box is made known to the operator by virtue fo the fact that the indicator rod 67 is now disposed inwardly fully within the spring seat 65, as shown in full lines in FIGS. 7 and 8.

Figure 2:
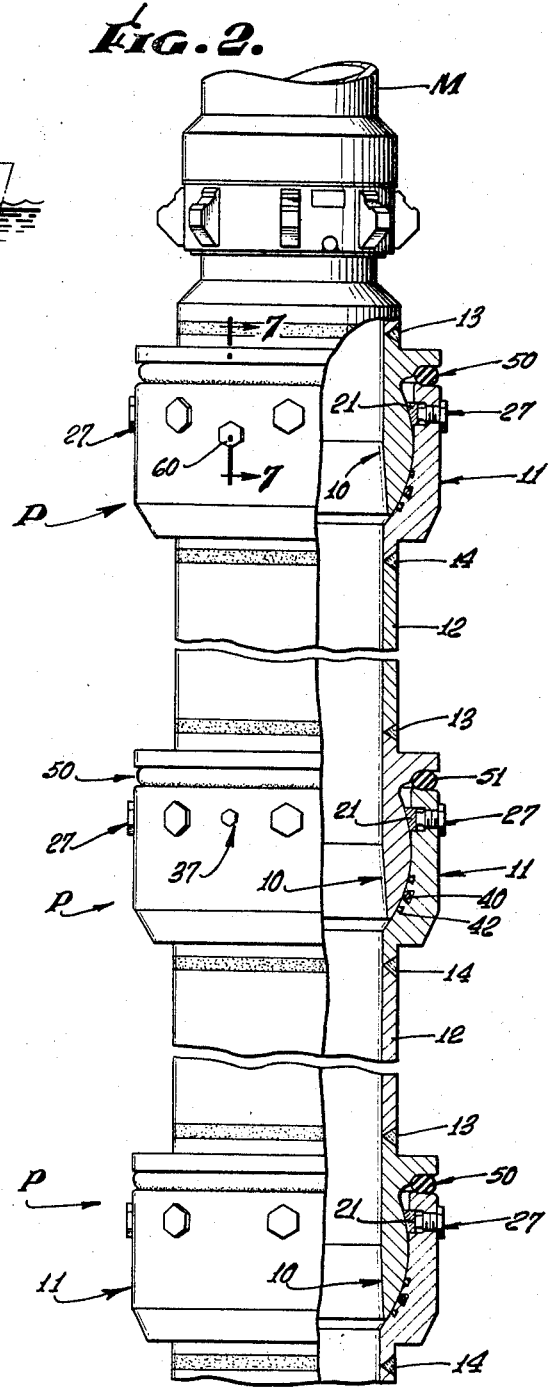
FIG. 2 is an enlarged side elevational view and longitudinal section of a series of flexible connectors disclosed in FIG. 1 and embodying the invention.

Heretofore, a single flexible joint has been provided, usually at the lower end of the marine conductor pipe M, permitting about 10 degrees of pivoting or flexing movement of the marine conductor pipe relative to the apparatus disposed therebelow. In the present case, each flexible joint has a much more limited extent of pivoting movement, which, for example, may be only a maximum of about 3 degrees between the pin 10 and box 11. However, a plurality of such flexible joints P are connected in series, such as disclosed in FIGS. 1 and 2, so that the joints cumulatively will still permit the same extent of deflection of the marine conductor pipe M relative to the equipment therebelow, but the pivoting action will not be concentrated at a single point. Instead, it is divided between the several flexible connectors P, which, by way of example, are disclosed as being three in number in the drawings. These flexible connectors may be separated from one another by any desired distance, which, for example, may be about 3 feet. However, the flexible connectors may be disposed at any desired location along the length of the marine conductor pipe M.

I claim:

1. In a flexible connector: a box member having an internal spherical surface and a wall merging into said spherical surface to define an entry thereto, said wall having a minimum diameter no less than the diameter through the center of said spherical sruface; a pin member in said box member and having an external spherical surface companion to and slidably engaging said internal spherical surface; means mounted between and engaging portions of each of said members to resist inward axial movement of said pin member in said box member and coengagement between said spherical surfaces; said box member having an internal circumferential groove; said members having intercommunicating passages; means comprising an expansible and contractible resilient split lock ring in said groove and prevented from shifting axially of said box member by the side walls of said groove, said ring having an inner tapered surface, said ring being shiftable to bring its tapered surface into engagement with said external spherical surface, the location of engagement being axially outwardly of said internal spherical surface and the maximum diameter of said external spherical surface normal to the axis of said pin member to retain said pin and box members coupled to each other while permitting their tilting with respect to each other; said means further comprising a plurality of circumferentially spaced members engaging said ring for shifting and holding said ring inwardly to bring and retain its tapered surface against said external spherical surface to shift said pin member axially of said box member against the force of said resisting means and engage said external surface snugly with said internal surface and hold said surfaces coengaged.

2. In a flexible connector as defined in claim 1; wherein said tapered surface of said lock ring is an internal spherical surface companion to and slidably engaging said external spherical surface.

3. In a flexible connector as defined in claim 1; wherein said lock ring tends to normally expand outwardly to permit passage of said pin member therethrough to place said external spherical surface into engagement with said internal spherical surface, said plurality of circumferentially spaced members being threaded into said box member and engageable with said ring to contract and hold said ring into engagement with said external spherical surface.

4. In a flexible connector as defined in claim 1; wherein said lock ring tends to normally expand outwardly to permit passage of said pin member therethrough to place said external spherical surface into engagement with said internal spherical surface, said plurality of circumferentially spaced members being threaded into said box member and engageable with said ring to contract said ring into engagement with said external spherical surface, said tapered surface of said lock ring being an internal spherical surface companion to and slidably engaging said external spherical surface.

5. In a flexible connector as defined in claim 1; wherein said plurality of circumferentially spaced members are threaded into said box member and engageable with said ring to effect shifting of said ring between expanded and contracted conditions.

6. In a flexible connector as defined in claim 1; said plurality of circumferentially spaced threaded members being threaded into said box member and engageable with said ring to effect shifting of said ring between expanded and contracted conditions, and means for locating said ring on said box member with the split of said ring out of alignment with all of said threaded members.

7. In a flexible connector as defined in claim 1; wherein said lock ring tends to normally expand outwardly to permit passage of said pin member therethrough to place said external spherical surface into engagement with said internal spherical surface, said plurality of circumferentially spaced members being threaded into said box member and engageable with said ring to contract said ring into engagement with said external spherical surface, and means for locating said ring on said box member with the split of said ring out of alignment with all of said threaded members.

8. In a flexible connector as defined in claim 1; wherein said lock ring tends to normally expand outwardly to permit passage of said pin member therethrugh to place said external spherical surface into engagement with said internal spherical surface, said plurality of circumferentially spaced members being threaded into said box member and engageable with said ring to contract said ring into engagement with said external spherical surface, said ring having a hole adjacent its split, and a locator pin on said box member in said hole to locate said ring on said box member with the split of said ring out of alignment with all of said threaded members.

9. In a flexible connector as defined in claim 1; said means mounted between and engaging said portions of each of said members comprising a solid, pliant, elastic ring compressed between said portions to retain said pin member and box member normally in alignment with each other, said solid ring requiring substantial lateral force imposed on one of said members to disalign said members, said solid ring returning said members to an aligned state upon decrease in said substantial lateral force.

10. In a flexible connector as defined in claim 9; said portion of said box member having a circumferential saddle concavely arcuate in cross-section; said portion of said pin member having a circumferential saddle concavely arcuate in cross-section and facing laterally outwardly in the same direction as said other saddle; said elastic ring being of toroidal shape and engaging and being compressed between said saddles, said saddles resisting radial inward movement of said elastic ring.

11. In a flexible connector: a box member having an internal spherical surface and a wall merging into said spherical surface to define an entry thereto, said wall having a minimum diameter no less than the diameter through the center of said spherical surface; a pin member in said box member and having an external spherical surface companion to and slidably engaging said internal spherical surface; said members having intercommunicating passages; means comprising an expansible and contractible lock ring carried by said box member and having a tapered surface, said ring being shiftable to bring its tapered surface into engagement with said external spherical surface to retain said pin and box members coupled to each other while permitting their tilting with respect to each other; said means further comprising a plurality of circumferentially spaced members engaging said ring for shifting and holding said ring inwardly to bring and retain its tapered surface against said external spherical surface to shift said pin member axially of said box member and engage said external surface snugly with said internal surface and hold said surfaces coengaged; wherein said lock ring tends to normally expand outwardly to permit passage of said pin member therethrough to place said external spherical surface into engagement with said internal spherical surface, said plurality of circumferentially spaced members being threaded into said box member and engageable with said ring to contract said ring into engagement with said external spherical surface, said ring being a split ring, said ring having a hole adjacent its split, and a locator pin on said box member in said hole to locate said ring on said box member with the split of said ring out of alignment with all of said threaded members, said hole and locator pin being offset from the central plane of said ring to prevent inverted assembly of said ring on said box member, said central plane being normal to the ring axis.

12. In a flexible connector: a box member having an internal spherical surface and a wall merging into said spherical surface to define an entry thereto, said wall having a minimum diameter no less than the diameter through the center of said spherical surface; a pin member in said box member and having an external spherical surface companion to and slidably engaging said internal spherical surface; said members having intercommunicating passages; means comprising an expansible and contractible lock ring carried by said box member and having a tapered surface, said ring being shiftable to bring its tapered surface into engagement with said external spherical surface to retain said pin and box members coupled to each other while premitting their tilting with respect to each other; said means further comprising a plurality of circumferentially spaced members engaging said ring for shifting and holding said ring inwardly to bring and retain its tapered surface against said external spherical surface to shift said pin member axially of said box member and engage said external surface snugly with said internal surface and hold said surfaces coengaged; wherein said ring is a split ring slidably mounted in an internal circumferential groove in said box member, said ring having a hole, and a locator pin on said box member extending into said groove and hole, said locator pin and hole being offset from the central plane of said ring and groove to prevent inverted assembly of said ring in said groove, said central plane being normal to the ring axis.

13. In a flexible connector: a box member having an internal spherical surface and a wall merging into said spherical surface to define an entry thereto, said wall having a minimum diameter no less than the diameter through the center of said spherical surface; a pin member in said box member and having an external spherical surface companion to and slidably engaging said internal spherical surface; said members having intercommunicating passages; means comprising an expansible and contractible lock ring carried by said box member and having a tapered surface, said ring being shiftable to bring its tapered surface into engagement with said external spherical surface to retain said pin and box members coupled to each other while permitting their tilting with respect to each other; said means further comprising a plurality of circumferentially spaced members engaging said ring for shifting and holding said ring inwardly to bring and retain its tapered surface against said external spherical surface to shift said pin member axially of said box member and engage said external surface snugly with said internal surface and hold said surfaces coengaged; and coengaging aligning means on said box and pin members preventing substantial relative rotation between said box and pin members while permitting their pivoting with respect to each other, and indicating means on said aligning means for indicating the aligned or disaligned condition of said box and pin members.

14. In a flexible connector: a box member having an internal spherical surface and a wall merging into said spherical surface to define an entry thereto, said wall having a minimum diameter no less than the diameter through the center of said spherical surface; a pin member in said box member and having an external spherical surface companion to and slidably engaging said internal spherical surface; said members having intercommunicating passages; means comprising an expansible and contractible lock ring carried by said box member and having a tapered surface, said ring being shiftable to bring its tapered surface into engagement with said external spherical surface to retain said pin and box members coupled to each other while permitting their til ting with respect to each other; said means further comprising a plurality of circumferentially spaced members engaging said ring for shifting and holding said ring inwardly to bring and retain its tapered surface against said external spherical surface to shift said pin member axially of said box member and engage said external surface snugly with said internal surface and hold said surfaces coengaged; said pin member having a slot opening through its external spherical surface, and an aligning pin disposed on said box member radially of the center of said spherical surfaces and movable into said slot to prevent substantial relative rotation between said box and pin members while permitting their pivoting with respect to each other.

15. In a flexible connector as defined in claim 14; and an indicator rod attached to said aligning pin and adapted to extend from said box member to indicate the position of said aligning pin within said slot or out of said slot.

16. In a flexible connector: a box member; a pin member pivotally mounted in said box member in normal alignment therewith; said members having intercommunicating passages; and yieldably stabilizing means engaging said members resisting relative pivotal movement between said members, said means comprising a solid, pliant, elastic ring compressed between said members and requiring substantial lateral force imposed on one of said members to disalign said members, said solid ring returning said members to an aligned state upon decrease in said substantial laterial force; wherein said box member has an internal spherical surface, said pin member having an external spherical surface companion to and slidably engaging said internal spherical surface, said box member and pin member having confronting radial shoulders disposed outwardly of the open end of said box member, said pliant, elastic ring being positioned axially between and engaging said shoulders, and means comprising an expansible and contractible lock ring carried by said box member and shiftable into engagement with said external spherical surface to retain said pin and box members coupled to each other while permitting their tilting with respect to each other, said lock ring compressing said pliant, elastic ring between said pin and box members by forcing said pin member into said box member, said retaining means further comprising instrumentalities for shifting and holding said lock ring inwardly against said external spherical surface to shift said pin member axially of said box member and engage said external surface snugly with said internal surface and hold surfaces coengaged and said elastic ring in compression between said shoulders of said pin and box members.

17. In a flexible connector: a box member; a pin member pivotally mounted in said box member in normal alignment therewith; said members having intercommunicating passages; and yieldable stabilizing means engaging said members resisting relative pivotal movement between said members, said means comprising a solid, pliant, elastic ring compressed between said members and requiring substantial lateral force imposed on one of said members to disalign said members, said solid ring returning said members to an aligned state upon decrease in said substantial lateral force; wherein said box member has an internal spherical surface, said pin member having an external spherical surface companion to and slidably engaging said internal spherical surface, said box member having confronting radial shoulders disposed outwardly of the open end of said box member, said pliant, elastic ring being positioned axially between and engaging said shoulders, a lock ring which tends to normally expand outwardly carried by said box member, a plurality of circumferentially spaced threaded members threaded into said box member and engageable with said ring to contract said ring into engagement with said external spherical surface to retain said pin and box members coupled to each other while permitting their tilting with respect to each other, said lock ring compressing said pliant, elastic ring between said shoulders of said pin and box members upon being forced against said pin member and urging said pin member into said box member.

18. In a flexible connector as defined in claim 17; said lock ring being a split ring, and means for locating said lock ring on said box member with the split of said lock ring out of alignment with all of said threaded members.

19. In a flexible connector as defined in claim 17; said lock ring being a split ring, means for locating said lock ring on said box member with the split of said lock ring out of alignment with all of said threaded members, and coengaging aligning means on said box and pin members preventing substantial relative rotation between said box and pin members while permitting their pivoting with respect to each other.

20. In a flexible connector as defined in claim 17; said lock ring being a split ring, means for locating said lock ring on said box member with the split of said lock ring out of alignment with all of said threaded members, said pin member having a slot opening through its external spherical surface, and an aligning pin disposed radially of the center of said spherical surfaces and movable into said slot to prevent substantial relative rotation between said box and pin members while permitting their pivoting with respect to each other.

References Cited

UNITED STATES PATENTS

| | | | |
|---|---|---|---|
| 203,611 | 5/1878 | Graydon | 285—166 |
| 859,165 | 7/1907 | Boswell | 285—263 X |
| 1,071,957 | 9/1913 | Rawson | 285—270 |
| 1,179,594 | 4/1916 | Wood | 285—261 |
| 2,085,986 | 7/1937 | Levier | 285—166 X |
| 2,692,102 | 10/1954 | Cobham et al. | 285—268 X |
| 2,877,732 | 3/1959 | Eaton | 285—321 X |
| 2,986,409 | 5/1961 | Weber | 285—321 X |
| 3,191,972 | 6/1965 | Collar | 285—93 |
| 3,216,751 | 11/1965 | Der Mott | 285—264 |
| 2,422,597 | 6/1947 | Stewart | 285—261 X |
| 2,473,502 | 6/1949 | Bard | 285—321 X |
| 3,345,087 | 10/1967 | Hanes et al. | 285—321 X |

FOREIGN PATENTS

| | | |
|---|---|---|
| 628,325 | 6/1927 | France. |
| 881,504 | 1/1943 | France. |
| 516,337 | 1/1931 | Germany. |
| 720,283 | 4/1942 | Germany. |
| 758,975 | 12/1952 | Germany. |
| 730,339 | 5/1955 | Great Britain. |
| 966,842 | 8/1964 | Great Britain. |

THOMAS F. CALLAGHAN, *Primary Examiner.*

U.S. Cl. X.R.

285—166, 264, 321